Feb. 11, 1930.  W. POLATSIK  1,746,964
METHOD OF TREATING WASTE LIQUIDS
Filed Dec. 30, 1926
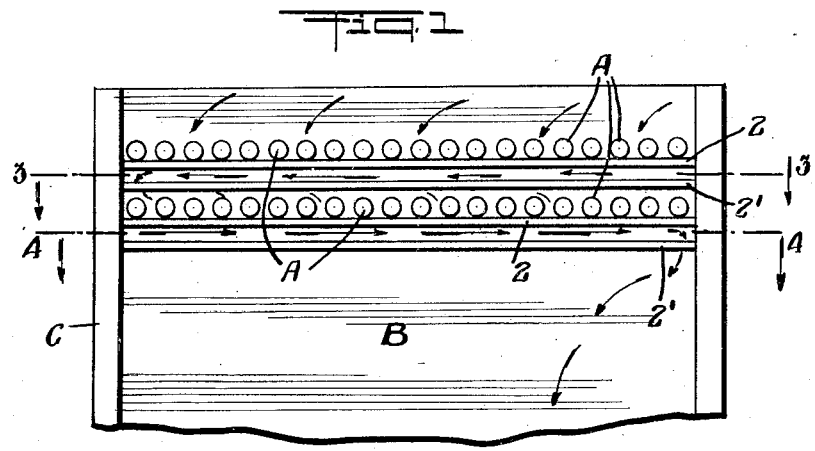
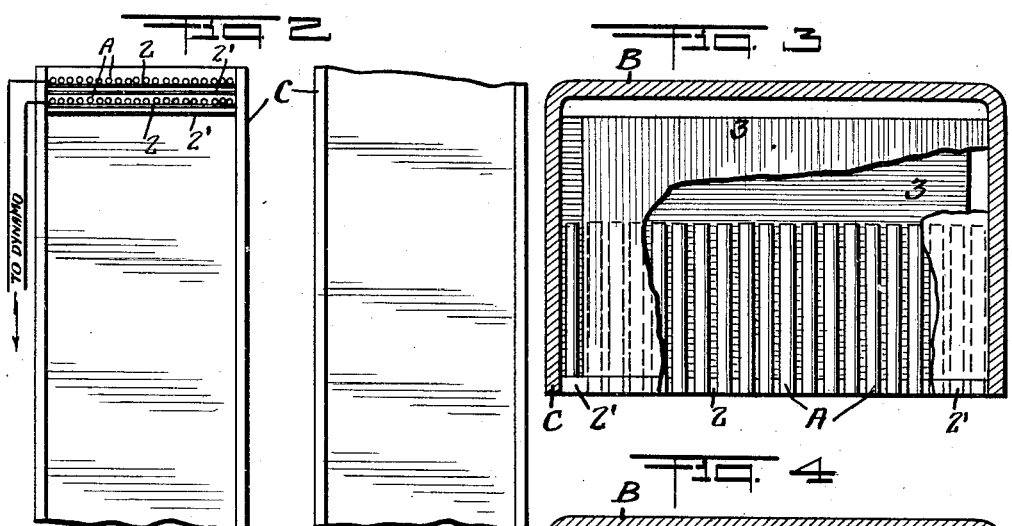
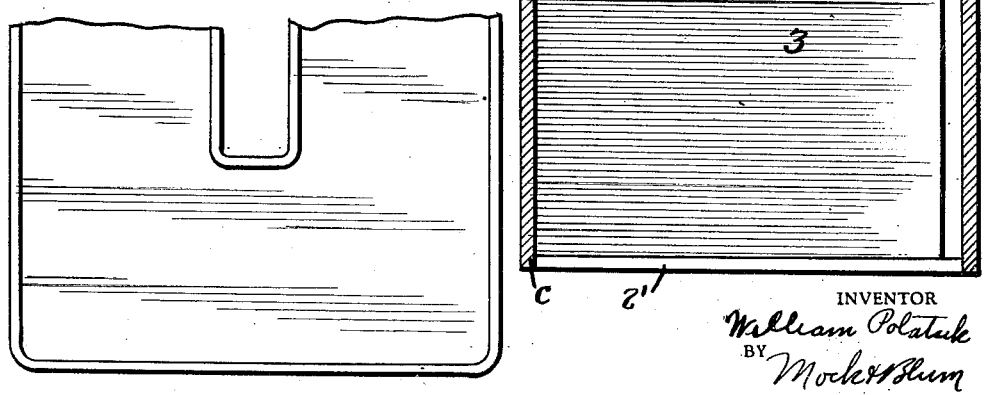
INVENTOR
William Polatsik
BY Mock & Blum
ATTORNEYS Patented Feb. 11, 1930

1,746,964

UNITED STATES PATENT OFFICE

WILLIAM POLATSIK, OF NEWARK, NEW JERSEY, ASSIGNOR OF FIFTEEN PER CENT TO FREDERICK J. BOWERS AND EIGHTY-FIVE PER CENT TO STANLEY J. LATHROP

METHOD OF TREATING WASTE LIQUIDS

Application filed December 30, 1926. Serial No. 157,904.

My invention relates to a new and improved method of and apparatus for treating sewage and waste liquids in general.

One of the objects of my invention is to provide a method of and apparatus for treating sewage and waste liquids which shall quickly and efficiently recover the greasy matters suspended in the liquid, in the form of a surface layer, so that the greasy matters are separated from the other solid matters present in the sewage.

Another object of my invention is to efficiently separate and recover the said greasy matters by causing them to form a thick, coherent top layer of considerable hardness which can be advantageously used industrially for making soaps and the like.

Another object of my invention is to devise a method and apparatus of the type above mentioned which can readily handle very large quantities of flowing sewage or other waste liquids.

Another object of my invention is to devise a method of and apparatus for separating the greasy matters which is not necessarily dependent upon killing bacteria in the sewage or other waste liquids.

Other objects of my invention will be set forth in the following description and drawings which illustrate a preferred embodiment thereof, it being understood that the above general statement of the objects of my invention is intended to merely generally illustrate the same and not to limit it in any manner.

The drawings diagrammatically show one of the embodiments of my invention.

Fig. 1 is a top detail view.

Fig. 2 is a top view showing two connected units.

Fig. 3 is an inverted section on the line 3—3 of Fig. 1, one of the diaphragm or plate electrodes being shown partially broken away.

Fig. 4 is an inverted section on the line 4—4 of Fig. 1.

It has been recognized for many years that the greasy matters suspended in sewage and other waste liquids have considerable industrial value if they are separated in proper form in an efficient and rapid manner.

Whenever settling tanks or the like have been employed to clarify sewage the non-greasy matters entrained the solid greasy matters present so that it required considerable time and large apparatus to clarify the sewage and it was thereafter very difficult to separate the greasy matters. The expense of separating the greasy matters was so great that these valuable waste products were not generally utilized.

According to my invention the greasy substances are very readily separated in the form of a thick, hard coherent surface layer which can be readily removed by means of suitable appliances and these greasy substances are largely free from the other solid and heavy substances present in the sewage.

The example of my invention herein given represents an actual working embodiment which has been successfully operated.

The sewage which had a flow of seven million (7,000,000) gallons per twenty four (24) hours was allowed to flow through a series of conduits C of substantially rectangular shape. The conduits had walls made of concrete and also had concrete bottoms B. These conduits were arranged in series, each of them being 150 feet long, 9 feet wide and from 6 to 6½ feet deep. These conduits can be arranged side by side connected at their ends so as to occupy a minimum of space and to allow the sewage (which term generally includes any waste or greasy liquid) to flow through them without interrupting the direction of flow, although the sewage can have a reverse flow in adjacent conduits.

A plurality of copper bars 2 and 2' arranged in batteries are provided in the said conduits. Adjacent copper bars 2 and 2' are preferably two inches apart. The copper bar 2 which may be termed the anode bar has twenty anodes A connected thereto. These anodes consist of graphite bars of cylindrical shape, about 3½ inches in diameter and forty-two (42) inches long.

Hence, the bottoms of these graphite anodes are spaced from the bottom of the conduit.

The cathode copper bar 2' has a diaphragm cathode 3 connected thereto. Each diaphragm cathode 3 is preferably made of ordinary rolled iron and each diaphragm is preferably imperforate. However, my invention is not limited to the use of iron for the cathode material, because copper and zinc have been found satisfactory and I do not wish to limit this part of my invention to the use of any particular metal.

Each diaphragm cathode 3 preferably extends to about four inches from the bottom of the conduit and abuts one vertical wall of the conduit and extends to about four inches from the other vertical wall of the conduit 1. That is, since each conduit is about nine feet wide, the width of the diaphragm is about eight (8) feet, eight (8) inches.

The second anode bar 2 is substantially the same as the first anode bar and the second cathode bar 2' has a second cathode diaphragm 3 substantially the same as the first save that the successive cathode diaphragms 3 are staggered so that alternate cathodes make contact with the same vertical wall of the conduit.

Each battery, therefore, consists of two cathode bars and two anode bars and there is preferably a space of about 100 feet between adjacent batteries.

Since each of these conduits is about 150 feet long, there are on the average three batteries to every two conduits.

Direct current is fed to the anode bars and cathode bars from any suitable source of current, and I prefer to employ a voltage of from 10 to 12 volts and an amperage of 20 to 60 amperes between each row of anodes and the adjacent cathode diaphragm.

Since sewage and waste liquids in general differ very largely in composition, and since their composition can vary according to the time of the year and even the day of the week, precise working directions for each individual case cannot be given, but generally speaking the higher amperages should be used in treating sewage which has relatively large amounts of greasy matters therein.

Sewage ordinarily has sufficient dissolved alkali therein to make it unnecessary to add any alkali or salts to render it a good conductor, but in treating certain types of waste liquid ordinary salt can be dissolved therein, both to increase the conductivity of the liquid and to increase the evolution of bubbles of gases. Instead of adding ordinary salt (sodium chloride) to a waste liquid a suitable quantity of an acid can be added thereto for the same purpose. A very weak solution of sulphuric acid, about 1½ percent by volume, has been found sufficient in treating waste liquids such as waste liquids from garages where considerable quantities of mineral oil residues have been found.

I have discovered that when an electric current is passed through sewage or waste liquid by means of ordinary electrodes, that the anodes soon become covered with a surface film of greasy or oily matters.

According to my invention the sewage is compelled to flow with considerable velocity parallel to each bank of anodes, because the sewage is compelled to flow in a relatively narrow path, which has a width of only about two inches. Under these circumstances, experience has shown that the anodes do not become covered with a surface film of greasy or oily matters, or at least if any such film is formed, it cannot be detected by the naked eye.

The result is that the device can be operated with maximum efficiency because the conductivity of the anodes is not lowered.

Likewise, a thick, hard and coherent surface layer of grease is rapidly formed in the flowing sewage. For example, in treating seven million (7,000,000) gallons for twenty-four (24) hours in the example before mentioned, I found that by utilizing only two of the batteries in two of the units (each 150 feet in length) that a surface layer of greasy substances about twenty-two (22) inches in thickness was formed at the end of six days. This top layer of grease became connected to the vertical walls of the conduit so as to form a hard, coherent covering for the flowing sewage and it was so hard that it could only be removed by the use of shovels or other suitable tools.

This grease did not have the typical sewage odor and the color thereof depended upon the type of sewage treated and also upon the metal used for the cathode diaphragm. For example, when an iron cathode diaphragm was utilized, the grease had a reddish brown color, when a zinc diaphragm was utilized the grease had a dark yellowish color and when a copper cathode diaphragm was utilized the grease had a greyish color. I believe that this variation in color is due to local reactions in which the metal of the diaphragm plays a part, as such diaphragms are of course not chemically pure.

The sewage or waste liquid which passes through the units after being treated according to my method is substantially free from greasy matters and can be treated by any suitable methods for removing the heavy solid substances present therein.

The grease recovered according to my method can be utilized directly for making soap, in forming tempering baths utilized in making steel and for many other industrial purposes.

While I do not wish to bind myself to any definite theory of operation since the reactions are complicated, I believe that the correct theory of my method is as follows:—

The reason why it is difficult to recover the greasy and oily substances from sewage is that a large part of such substances are present in the form of very fine particles which tend to be entrained by the heavy, solid substances present in the sewage. When a current is led through the sewage in the ordinary manner, the grease or oil particles tend to collect upon the anodes due to the effect of cataphoresis.

By employing a current of proper amperage and voltage and by having the sewage flow with sufficient velocity with respect to the anodes, the oil or grease particles which have been caused to coalesce so as to form larger particles, by the action of the electric current are not permitted to deposit upon the anodes. On the contrary, they are swept away from the anodes into the free spaces between consecutive batteries.

In these free spaces the velocity of flow of the sewage is much less than in the relatively narrow spaces between the bars 2 and 2′ so that the larger particles which have been thus formed are free to coalesce and rise to the top.

Since the oil and grease particles are thus permitted to coalesce substantially free from the heavier substances present in the sewage, they form a hard, coherent layer as above mentioned instead of a loose, slimy layer.

When the apparatus is operated with the use of a current of sufficiently high amperage, a vigorous formation of gas bubbles takes place so that a large number of gas bubbles are visible to the naked eye and these rise to the top of the liquid. The number of gas bubbles thus evolved is greater than when the cathode consists of a series of separated members, similar to the separated anodes. I believe that part of the new effect above mentioned is produced by the fact that since a large number of gas bubbles are formed in a relatively confined space, and since these gas bubbles always rise to the top of the liquid, that these bubbles tend to carry with them the particles of greasy and fatty substances so that they tend to coalesce at the top of the narrow vein of the liquid which is being treated. The fact that the grease which is thus deposited at the upper surface of the flowing liquid does not have the objectionable odor of grease recovered in the ordinary manner from sewage indicates that by permitting the gas thus evolved to act in the form of numerous fine bubbles upon the particles of oil, fat and the like, that a rapid deodorizing action takes place. The gas or gases which are thus formed in the liquid and are allowed to bubble through it consist of oxygen, chlorine, etc. which had a powerful deodorizing and antiseptic action.

Whenever I refer in the description or claims to greasy substances or matters, it is to be understood that I intend to generally include oily substances or matter.

While I have given a preferred embodiment and an actual working example of my invention it is obvious that numerous changes and omissions should be made to meet local conditions or individual cases and I do not wish to be limited to the details before mentioned as it is obvious that numerous changes and omissions could be made without departing from the spirit of my invention.

Claims:

1. In an apparatus for separating greasy matters from a flowing liquid so as to form a surface layer of such greasy matters, a conduit of substantially rectangular shape, an anode copper bar and a cathode copper bar, said bars being spaced apart and transverse to the longitudinal axis of the conduit, a plurality of cylindrical graphite bars attached to the anode bar, and a metal diaphragm plate attached to the cathode bar, said plate abutting one vertical wall of the conduit and being spaced from the opposite wall.

2. In an apparatus for separating greasy matters from a flowing liquid so as to form a surface layer of such greasy matters, a conduit, a pair of metal bars, said bars being spaced apart, a plurality of current conducting members attached to one of the bars, and a metal plate attached to the other bar, said plate abutting one wall of the conduit and being spaced from the opposite wall.

3. In an apparatus for separating greasy matters from a flowing liquid so as to form a surface layer of such greasy matters, a conduit, a plurality of batteries positioned in the conduit, each of said batteries comprising a pair of metal bars, one of the bars having a plurality of current conducting members attached thereto, and the other bar having a metal plate attached thereto, said plate abutting one wall of the conduit and being spaced from the opposite wall, the plates in the several batteries being staggered so that alternate plates abut the same wall of the conduit.

In testimony whereof I affix my signature.

DR. WILLIAM POLATSIK.